Dec. 4, 1951 W. H. LEWIS 2,577,472
CIRCUIT FOR MULTIPLE CHANNEL RECORDING GALVANOMETERS
Filed July 14, 1948
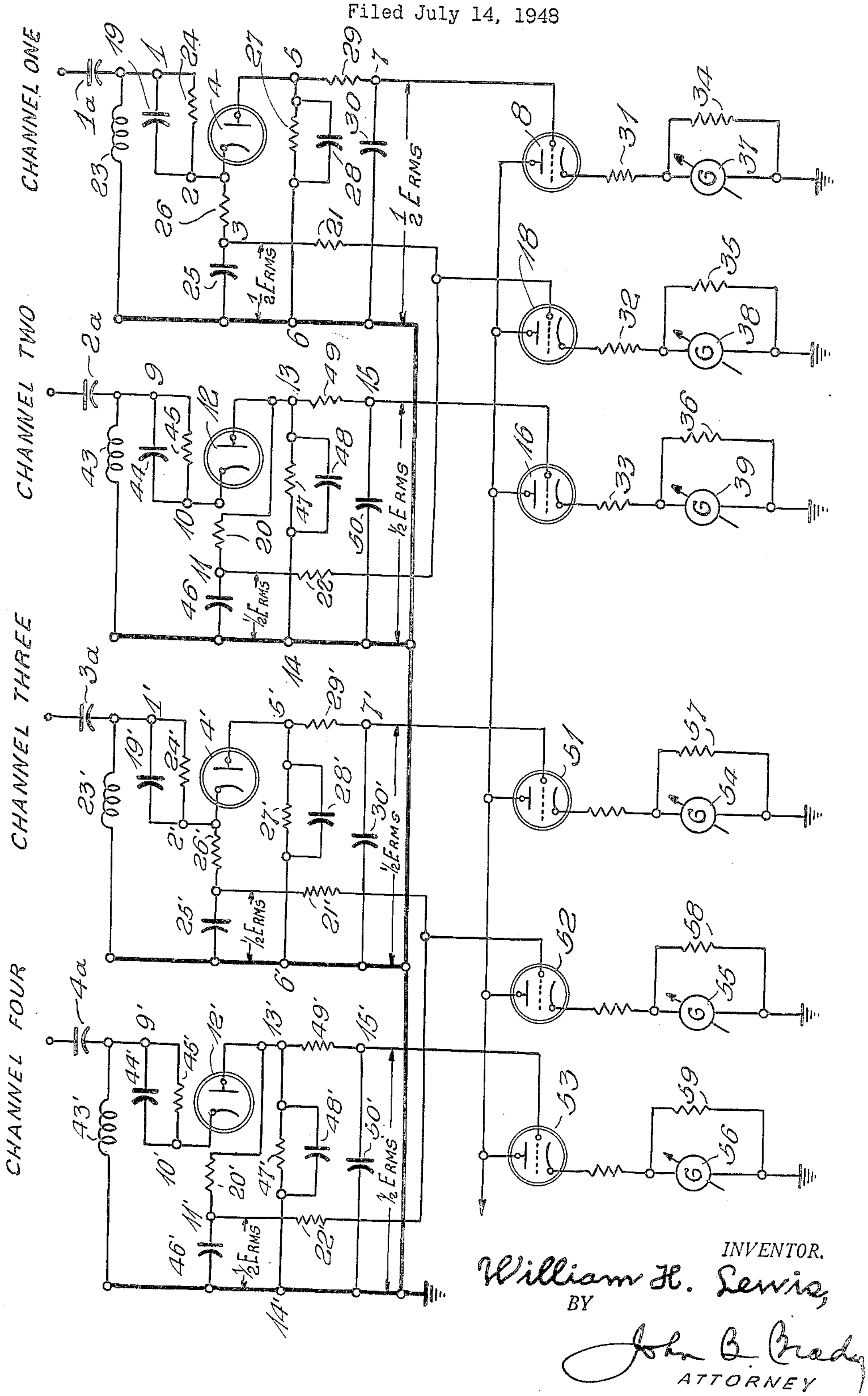
INVENTOR.
William H. Lewis,
BY
John B. Brady
ATTORNEY Patented Dec. 4, 1951

2,577,472

UNITED STATES PATENT OFFICE 2,577,472

CIRCUIT FOR MULTIPLE CHANNEL RECORDING GALVANOMETERS

William H. Lewis, State College, Pa., assignor, by mesne assignments, to The Pennsylvania Research Corporation, a corporation of Pennsylvania Application July 14, 1948, Serial No. 38,725

4 Claims. (Cl. 171—95)

My invention relates broadly to galvanometer control circuits and more particularly to a multiple channel recording galvanometer for multicolor recording on film.

One of the objects of my invention is to provide a circuit arrangement for a multiple channel galvanometer system for color recording on film in which rectification and subtraction of adjacent pairs of signals is effected for control of individual galvanometer systems.

Another object of my invention is to provide an arrangement of peaking networks in a multiple channel galvanometer for controlling the maximum fluctuations in frequency that may be delivered to the galvanometer.

A further object of my invention is to provide an arrangement of coacting diodes and filters in each channel of a multiple channel galvanometer system by which the diodes draw current on the negative peaks of the input current while on the positive peaks of the input current the diodes block the current to associated networks and the multiple channel galvanometer system.

Other and further objects of my invention are to provide an improved circuit arrangement for a multiple channel galvanometer system as set forth more fully in the specification hereinafter following by reference to the accompanying drawing which diagrammatically shows my invention.

My invention is directed to a rectification and direct current amplifier circuit for a multiple channel galvanometer system in which variable currents impressed upon the rectification circuit control individual galvanometers for controlling light beams through color filters for selecting and effecting the recording of variable traces on a color film. The multiple channels each include an A.-C. amplifier the output of which is impedance coupled to a symmetrical rectifier and subtraction system which delivers both positive and negative voltages of equal magnitude and with identical time constants to the D.-C. galvanometer deflection amplifiers. The circuit of the rectification and subtraction stage functions as follows: On negative peaks of the input signal, the diode draws current causing the voltage to be equally divided between the two "peaking" networks. During the positive peaks of the input signal, the diode "blocks," applying all of the voltage to the first peaking network where an addition of the positive and negative voltages takes place. This action results in a net positive voltage of approximately ½ $E_{rms}$ across the second peaking network and a negative voltage of approximately ½ $E_{rms}$ across the first. These voltages are then applied to a pair of resistance-capacitance filter networks which are closely matched on a time-constant basis. These filters determine the maximum fluctuation frequency that may be delivered to the galvanometer.

To facilitate the determination of the degree of correlation between the fluctuations of adjacent input signals it is desirable to record the differences between incoming signals as well as the level of each signal. To do this, the positive voltage from one rectifier is combined directly with the negative voltage from an adjacent rectifier through isolation resistors, thus producing a voltage which is proportional to the difference between pairs of input signals.

Since the output impedance of the rectifier system is quite high, it is impractical to drive the galvanometer directly. For this reason a triode connected as a cathode follower impedance transformer is introduced between the rectifier and the galvanometer. A direct-coupled stage of this type is sensitive to heater supply voltage variations which result in a change in the effective grid bias on the tube. This effect is not caused by a loss in cathode emission, since the tube is always operated in its space-charge-limited state, but rather by variations in "contact" potential, etc., that are rather complex functions of heater voltage. Output current variations that are caused by this effect are minimized by driving the cathode follower negatively from the rectifier, thus combining the positive variations across the rectifier with the negative variations across the cathode follower grid. The tendency toward current variation in the galvanometer as a function of supply voltage was further minimzed by regulating the plate voltage.

The galvanometer elements are placed in series with the cathodes and shunted with sufficient resistance to give an optimally flat response to the galvanometer.

Detailed reference will be made in explaining the circuit as shown in the drawing to channels one and two since channel three is identical with channel one and channel four is identical with channel two. The input to each network rectifier circuit is connected with the input terminal through an adjustable capacity indicated at 1a, 2a, 3a and 4a.

Vacuum tube 4 is a diode oriented so that it offers to an incoming negative signal an impedance negligible compared to that of the peaking networks 1—2, each formed by condensers shunted by resistors 5—6. However, to a positive signal, it presents an almost infinite impedance. The networks 1—2 and 5—6 have identical time constants equal to the time between several peaks of an oscillatory signal applied at the A.-C. input terminal but short compared to the envelope of these peaks. In the case of a negative peak at this input terminal, the voltage is divided effectively equally between networks 1—2 and 5—6, the impedance of the networks 2—3—6 and 5—6—7 being much greater than that of the peaking networks. Thus the potential at point 5 rises to approximately half the peak voltage of the negative peak. On the presentation of a positive peak to the A.-C. input, there is no effect at point 5 since it is effectively isolated by the extremely high impedance of the diode 4 in this case. Since very little current is drawn by the grid circuit of vacuum tube 8, the smoothing circuit or filter network 5—6—7 causes a negative voltage at 7 equal to approximately one-half the peak value of the A.-C. input signal.

During the negative peak, the condenser 19 is charged with the polarity as indicated to a voltage of approximately one-half the negative peak voltage. Upon the presentation of a positive peak at the A. C. input, the entire positive peak is presented to the peaking network 1—2. Since the condenser 19 has not had time to discharge, the net voltage appearing at the cathode of the diode is the difference between the magnitude of the positive peak and the potential to which the condenser 19 was charged, leaving a net positive potential at the diode cathode of one-half the peak voltage. The smoothing network 2—3—6 operates in a manner identical to that of the network 5—6—7 leaving at point 3 a smooth, positive voltage equal to approximately one-half the R. M. S. value of the A. C. input voltage.

In the case of channel two, the performance on a negative peak is identical with that of channel one, the smooth negative voltage being applied to the grid of vacuum tube 16. The resistor 20 is, however, tied to the plate rather than to the cathode of the diode, making points 11 and 15 identical with respect to both the sign and magnitude of the voltages appearing at those points. In order to obtain a measure of the difference between signals at the terminals of channels one and two, the voltages appearing at points 3 and 4 are applied through identical isolating resistors 21 and 22 to the grid of vacuum tube 18.

The vacuum tubes 8, 16 and 18 serve as impedance transformers between the diode circuits (high impedance circuits) and the galvanometer circuits (low impedance circuits). The cathode circuit of these vacuum tubes 8, 16 and 18 are low impedance networks, the current through which is governed by the voltages applied to the grids of these tubes. The galvanometer inserted in series with these cathodes produces displacements which indicate directly the magnitudes of the input signals at the terminals of channels one and two, together with the difference between those magnitudes.

Variations in galvanometer current due to changes in effective grid bias of tubes 8, 16 and 18 caused by a drop in cathode heater voltage are balanced by a corresponding change of opposite sign in the voltage across the diodes 4 and 12 due to the same change in heater current. Further stabilization may be obtained by the use of regulated power supplies.

Inasmuch as the rectification and filter circuits are identical in each of the channels I am listing the values of each of the circuit components as follows:

| | |
|---|---|
| Condenser 1a | 0.01 mfd. |
| Inductance 23 | 10 henries |
| Condenser 19 | 1,000 f. |
| Resistor 24 | 0.18 megohm |
| Condenser 25 | 0.1 mfd. |
| Resistor 26 | 1.2 megohms |
| Diode 4 | ½ 6AL5 |
| Resistor 27 | 0.18 megohm |
| Condenser 28 | 1,000 f. |
| Resistor 21 | 1.8 megohms |
| Resistor 29 | 1.2 megohms |
| Condenser 30 | 0.1 mfd. |
| Tubes 8, 18, 16 | ½ 6SN7 |
| Resistors 31, 32, 33 | 1,500 ohms |
| Resistors 34, 35, 36 | 15 ohms |

The input to channel one is impressed across inductance 23 and through peaking network 1—2 formed by condenser 19 and resistor 24 with one side of diode 4. The same side of diode 4 connects to ground through capacity 25 and resistor 26. The output of diode 4 contains filter network 5, 6, 7, containing resistors 27 and 29 and capacity 28. The output of the rectifier filter system is shunted by condenser 30. The isolating resistors 21 and 22 connect between the points 3 and 11 in channels one and two respectively and connect with the control grid of tube 18 whose output circuit connects through resistor 32 with galvanometer 38. Tube 16 has its grid connected to the output of the rectifier and filter system in channel two as shown. Channel two includes as circuit components inductance 43 corresponding to inductance 23 in channel one; capacity 44 corresponds to capacity 19 in channel one; resistor 45 corresponds to resistor 24 in channel one; capacity 46 corresponds to capacity 25 in channel one; resistor 20 corresponds with resistor 26 in channel one; resistor 47 corresponds to resistor 27 in channel one; capacity 48 corresponds with capacity 28 in channel one; resistor 49 corresponds with resistor 29 in channel one; capacity 50 corresponds with capacity 30 in channel one; and resistor 22 corresponds with resistor 21 in channel one.

The galvanometers 37, 38 and 39 each operate mirrors that control light beams directed through filters for recording light traces on color film for distinctly contrasting the curves which are reproduced by the several variable currents impressed upon the several channels.

As heretofore pointed out channel three is identical with channel one and channel four is identical with channel two. Hence I have designated corresponding circuit components in these channels with similar reference characters by adding prime identifications so that the circuit elements of channels three and four are indicated by primed reference characters corresponding to the reference characters of channels one and two, respectively.

Channels three and four have their outputs connected to the impedance transformers constituted by tubes 51, 52 and 53 arranged in a manner similar to tubes 8, 18 and 16 with the output circuits thereof connected to galvanometers 54, 55 and 56, respectively. Each of these galvanometers is shunted by a resistor 57, 58 and 59 as shown.

I have found the circuit of my invention practical and efficient in operation and while I have illustrated my invention in certain preferred embodiments, I realize that modifications and changes may be made, and I desire that it be understood that no limitations upon my invention are intended other than may be imposed by the scope of the appended claims.

What I claim as new and desire to secure by Letters Patent of the United States is as follows:

1. A system for controlling a multiplicity of galvanometers for recording adjacent light traces on film comprising a multiplicity of input circuit channels, a diode rectifier including a cathode and an anode individual to each of said channels, a multiplicity of electron tube amplifiers each including an anode, a control grid and a cathode, an output circuit individual to the anode and cathode of each of said amplifiers, a galvanometer individual to each of said output circuits, a connection between the anode of the individual diode rectifiers and the control grid of the respective electron tube amplifiers, a circuit extending between the anode of one diode rectifier in one of said channels and the cathode of the diode rectifier in the adjacent channel, a connection between said last mentioned circuit and the control grid of an additional electron tube amplifier, and a galvanometer connected with the output of said last mentioned amplifier.

2. A system for controlling a multiplicity of galvanometers for recording adjacent light traces on film as set forth in claim 1 in which the circuit extending between the anode of one diode rectifier in one of said channels and the cathode of the diode rectifier in the adjacent channel includes isolating resistors and wherein the connection between the control grid of said last mentioned electron tube amplifier extends to a tap between said isolating resistors.

3. A system for controlling a multiplicity of galvanometers for recording adjacent light traces on film as set forth in claim 1 in which the circuit extending between the anode of one diode rectifier in one of said channels and the cathode of the diode rectifier in the adjacent channel, combines positive voltage from one diode rectifier directly with negative voltage from the adjacent diode rectifier for producing a voltage which is proportional to the difference between the energy impressed upon the adjacent input circuit channels, said last mentioned voltage being impressed upon the control grid of said last mentioned amplifier, and means for peaking both the input and output circuit paths of each of said diode rectifiers for selective response to predetermined frequencies impressed upon said input circuit channels.

4. A system for controlling a multiplicity of galvanometers for recording adjacent light traces on film as set forth in claim 1 in which the circuit extending between the anode of one diode rectifier in one of said channels and the cathode of the diode rectifier in the adjacent channel includes a pair of impedance elements one of which is located adjacent the termination of said last mentioned circuit with the anode of said first mentioned diode rectifier and the other of which is located adjacent the cathode of said last mentioned diode rectifier, and wherein the connection between the control grid of said last mentioned electron tube amplifier extends to a tap between said impedance elements.

WILLIAM H. LEWIS.

REFERENCES CITED

The following references are of record in the file of this patent:

UNITED STATES PATENTS

| Number | Name | Date |
|---|---|---|
| 2,196,590 | Koch | Apr. 9, 1940 |
| 2,508,996 | Elam | May 23, 1950 |
| 2,510,930 | MacLeish | June 6, 1950 |